United States Patent
Liles et al.

(10) Patent No.: US 9,183,395 B2
(45) Date of Patent: *Nov. 10, 2015

(54) SYSTEM AND METHOD FOR SECURE INFORMATION HANDLING SYSTEM FLASH MEMORY ACCESS

(71) Applicant: Dell Products L.P., Round Rock, TX (US)

(72) Inventors: Terry Wayne Liles, Round Rock, TX (US); Charles T. Perusse, Jr., Pflugerville, TX (US); Yong Cao, Cedar Park, TX (US); Abhay Arjun Salunke, Austin, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,519

(22) Filed: Jun. 15, 2015

(65) Prior Publication Data

US 2015/0278524 A1    Oct. 1, 2015

Related U.S. Application Data

(63) Continuation of application No. 12/198,236, filed on Aug. 26, 2008, now Pat. No. 9,069,965.

(51) Int. Cl.
*G06F 21/57* (2013.01)
*G06F 9/445* (2006.01)

(52) U.S. Cl.
CPC ........... *G06F 21/572* (2013.01); *G06F 8/67* (2013.01)

(58) Field of Classification Search
CPC .................................................. G06F 21/572
See application file for complete search history.

(56) References Cited

U.S. PATENT DOCUMENTS

| | | | |
|---|---|---|---|
| 6,138,236 | A | 10/2000 | Mirov et al. |
| 6,640,334 | B1 | 10/2003 | Rasmussen |
| 6,944,854 | B2 | 9/2005 | Kehne et al. |
| 7,484,084 | B1 | 1/2009 | Ranaweera et al. |
| 7,843,907 | B1 | 11/2010 | Abou-Emara et al. |
| 7,860,097 | B1 | 12/2010 | Lovett et al. |
| 7,953,903 | B1 | 5/2011 | Finkelstein et al. |

(Continued)

OTHER PUBLICATIONS

Bidgoli, Hossein, The Internet Encyclopedia, vol. 1 A-F, 2004, Wiley & Sons.

(Continued)

*Primary Examiner* — Jacob C. Coppola
(74) *Attorney, Agent, or Firm* — Terrile, Cannatti, Chambers & Holland, LLP; Robert W. Holland (57) ABSTRACT

Firmware updates at an information handling system flash memory device, such as provisioning information stored on a USB device, are securely performed by using a buffer memory and a secured code. An application running on a CPU generates a firmware update and a security code, such as a ciphered hash code based on the firmware update, stores the firmware update and security code in a buffer, and informs a management processor of the update. The management processor analyzes the firmware update to authorize copying of the update from the buffer to the flash memory device. For instance, the management processor creates the security code from the firmware update and compares the created code with the security code stored in the buffer to validate the firmware update.

16 Claims, 5 Drawing Sheets

(56) References Cited

U.S. PATENT DOCUMENTS

| | | |
|---|---|---|
| 8,214,653 B1 | 7/2012 | Marr et al. |
| 8,819,563 B2 | 8/2014 | Hass et al. |
| 2002/0092008 A1 | 7/2002 | Kehne et al. |
| 2003/0023966 A1 | 1/2003 | Shimizu et al. |
| 2003/0028633 A1 | 2/2003 | Lindsay et al. |
| 2003/0191955 A1 | 10/2003 | Wagner et al. |
| 2004/0024917 A1 | 2/2004 | Kennedy et al. |
| 2004/0025036 A1 | 2/2004 | Balard et al. |
| 2004/0064457 A1 | 4/2004 | Zimmer et al. |
| 2004/0076043 A1 | 4/2004 | Boals et al. |
| 2004/0255286 A1 | 12/2004 | Rothman et al. |
| 2005/0021968 A1 | 1/2005 | Zimmer et al. |
| 2005/0188366 A1 | 8/2005 | Chang |
| 2005/0228888 A1 | 10/2005 | Mihm et al. |
| 2005/0229173 A1 | 10/2005 | Mihm et al. |
| 2005/0263977 A1 | 12/2005 | Pan |
| 2006/0020758 A1 | 1/2006 | Wheeler et al. |
| 2006/0107071 A1 | 5/2006 | Girish et al. |
| 2006/0143473 A1 | 6/2006 | Kumar |
| 2006/0143600 A1 | 6/2006 | Cottrell et al. |
| 2006/0174109 A1 | 8/2006 | Flynn |
| 2006/0179487 A1 | 8/2006 | Hatakeyama |
| 2007/0006306 A1 | 1/2007 | Seifert et al. |
| 2007/0038801 A1 | 2/2007 | Tanaka |
| 2007/0050548 A1 | 3/2007 | Bali et al. |
| 2007/0143530 A1 | 6/2007 | Rudelic et al. |
| 2008/0052506 A1 | 2/2008 | Iima et al. |
| 2008/0141235 A1 | 6/2008 | Woodbury et al. |
| 2008/0163256 A1 | 7/2008 | Khanna et al. |
| 2008/0168244 A1 | 7/2008 | Chu Chen et al. |
| 2009/0077370 A1 | 3/2009 | Barabash et al. |
| 2009/0217163 A1 | 8/2009 | Jaroker |
| 2009/0241103 A1 | 9/2009 | Pennisi et al. |
| 2010/0023777 A1 | 1/2010 | Prevost et al. |
| 2010/0228960 A1 | 9/2010 | Huang et al. |
| 2011/0078299 A1 | 3/2011 | Nagapudi et al. |

OTHER PUBLICATIONS

White, Ron, How Computers Work, Seventh Edition, Que Publications, 2004.

Menezes et al., Handbook of Applied Cryptography, www.cacr.math.uwaterloo.ca/hac, 1996.

IPMI Intelligent Platform Management Interface Specification Second Generation, v2.0, Feb. 2004.

White, Ron, How Computers Work, Millennium Edition, Que Publications, 1999.

*Figure 3C*

SYSTEM AND METHOD FOR SECURE INFORMATION HANDLING SYSTEM FLASH MEMORY ACCESS

CONTINUING DATA

This application is a continuation of U.S. patent application Ser. No. 12/198,236, filed Aug. 26, 2008, entitled "System and Method for Secure Information Handling System Flash Memory Access," now U.S. Pat. No. 9,069,965, issued Jun. 30, 2015, which includes exemplary systems and methods and is incorporated by reference in its entirety.

BACKGROUND OF THE INVENTION

1. Field of the Invention

The present invention relates in general to the field of information handling system memory, and more particularly to a system and method for secure information handling system flash memory access.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As businesses and individuals increasingly rely on information handling systems, secure and economical storage of information presents a continuing challenge. Malicious attacks often seek confidential information stored on information handling systems. In other instances, malicious attacks seek to disable networks so that legitimate users cannot access information. Hackers have grown adept at attacking networks through a variety of techniques at all levels of the network, including client and server information handling systems. Some forms of malicious attacks seek not only to obtain confidential information, but also to maintain a presence on client and/or server information handling systems for continuing attacks. To prevent malicious attacks, use a variety of techniques, such as firewalls and antivirus applications. Hackers often see protective measures meant to prevent malicious attacks as challenges to overcome. The result is a continuing cat-and-mouse game in which network administrators move to prevent foreseeable malicious attacks while hackers seek to exploit the unforeseen.

Server information handling systems typically have access to information stored at a variety of locations that is vulnerable to attack. One example of memory that is vulnerable to attack is flash memory used to manage or control one or more server information handling systems. For example, server information handling systems often include a management processor, such as a baseboard management controller or chassis management controller, which provides "out-of-band" access to the server information, such as remote power control and remotely directed upgrades. The management controller typically includes flash memory that stores instructions for managing the information handling system, such as instructions to perform provisioning. For instance, flash memory of the management controller is divided into a variety of partitions with each partition serving a particular task and having data related to that task. Each partition of the flash memory can be exposed to the operating system of the server information handling system as a writable USB hard disk drive or USB key by the management controller. The management controller faces many of the same security issues of any normal storage device in an operating system environment, such as writes and reads by multiple users, virus or other malicious software or rogue programs that induce multiple write erases. Such threats at a management controller level can lead to data loss or denial of service attacks since data corruption can, for instance, cause provisioning not to function.

SUMMARY OF THE INVENTION

Therefore, a need has arisen for a system and method which provides secure information handling system flash memory access.

In accordance with the present invention, a system and method are provided which substantially reduce the disadvantages and problems associated with previous methods and systems for securing information handling system flash memory. Flash memory updates, such as updates to provisioning information stored on a USB storage device, are managed with a post operating system application running on a CPU and a management processor. Commands to perform a firmware update are communicated through a management bus, such as an IPMI bus, with the performance of update tasks done through a system bus.

More specifically, an information handling system built from a variety of hardware components operating in a hardware layer processes information with firmware in a firmware layer, an operating system in an operating system layer and applications running over the operating system layer. A post operating system application running in the application layer, such as a firmware updater, prepares updates to apply to flash memory, such as a USB storage device partitioned to store firmware, such as provisioning information. The post operating system application stores the update in a configuration file in a buffer, such as RAM accessible by a management processor. The configuration file includes a security code generated from information stored in the configuration file, such as the firmware update. The post-operating system application sends a message to the management processor through a management bus, such as an IPMI bus, to initiate the update. The management processor analyzes the configuration file to validate the update, such as by independently generating the security code, and commands the update to the flash memory if the update is validated. The update is copied from the buffer to the flash memory through a system bus after the update is validated by the management processor.

The present invention provides a number of important technical advantages. One example of an important technical advantage is that information handling system flash memory access remains secure, such as during updates to information stored on the flash memory. The flash memory device is isolated from operating system applications so that malicious attacks through operating system applications are prevented from damaging the flash memory device or functions supported by the flash memory device, such as provisioning. Centralized access to the flash memory device is controlled by a management processor for improved security that still allows flexible utilization of the flash memory device. A robust and trustable manner for transferring data from operating system level applications is provided, such as for performing updates to the flash memory and functions supported by the flash memory.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Secure writes to a storage device of an information handling system are performed with cooperation of a management processor and CPU of the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
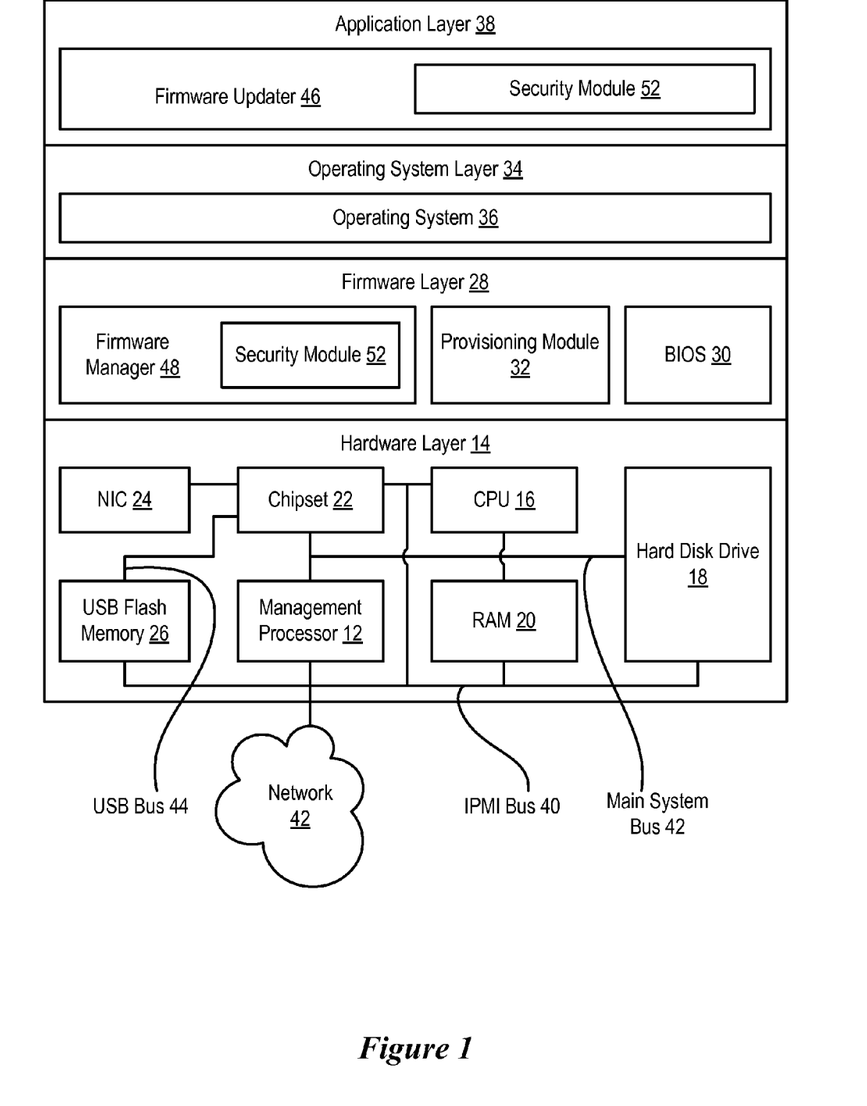
FIG. 1 depicts a block diagram of an information handling system having secure updates to a storage device performed in part by a management controller.

Referring now to FIG. 1, a block diagram depicts an information handling system 10 having secure updates to a storage device performed in part by a management processor 12, such as a baseboard management controller (BMC) or similar system or chassis level management processor. Information handling system 10 processes information with a hardware layer 14 that includes a variety of hardware devices, such as a CPU 16, a hard disk drive 18, RAM 20, a chipset 22, a NIC 24 and a USB flash memory storage device 26. The hardware devices are managed at a physical level by a firmware layer 28, such as BIOS 30 and a provisioning module 32, which provisions tasks performed by information handling system 10. An operating system layer 34 coordinates communication between hardware devices with an operating system 36 to support the running of applications in an application layer 38. Operating system 36 is stored in hard disk drive 18 and boots to run on CPU 16 with RAM 20 under the control of firmware, such as BIOS 30, which is stored in flash memory devices associated with chipset 22, such as USB flash memory 26. Management processor 12 provides management functions for information handling system 10, such as remote power-up, remote power-down, maintenance and monitoring. An IPMI bus 40 provides "out-of-band" network communications with network 42 to support remote access to management processor 12. Primary network communications for information on a main system bus 42 is through a network interface card 24. IPMI bus 40 provides a safe communications channel that protected by an operating system secure mechanism to limit vulnerability of the channel to applications running on applications layer 38, such as viruses or other malicious programs.

Information stored in USB flash memory 26 is protected by allowing changes made by post-operating system applications running in application layer 38 only with the cooperation of management processor 12. USB flash memory 26 appears to application layer 38 as a USB solid-state storage device, such as a USB key, accessible by a USB bus 44. An application, such as firmware updater 46, running at application layer 38 updates information on USB flash memory 26 by preparing an update configuration file and placing the update configuration file in a predefined buffer, such as a defined memory location in RAM 20 are hard disk drive 18. USB flash memory 26 is not exposed directly as a writeable device to firmware updater 46 and thus is not exposed to malicious programs or hackers running through application layer 38. Instead, once firmware updater 46 writes a configuration file to a buffer, a request is sent by firmware updater 46 to management processor 12 through IPMI bus 40 to notify a firmware manager 48 running as firmware on management processor 12 to perform the update defined by the configuration file.

Figure 2:
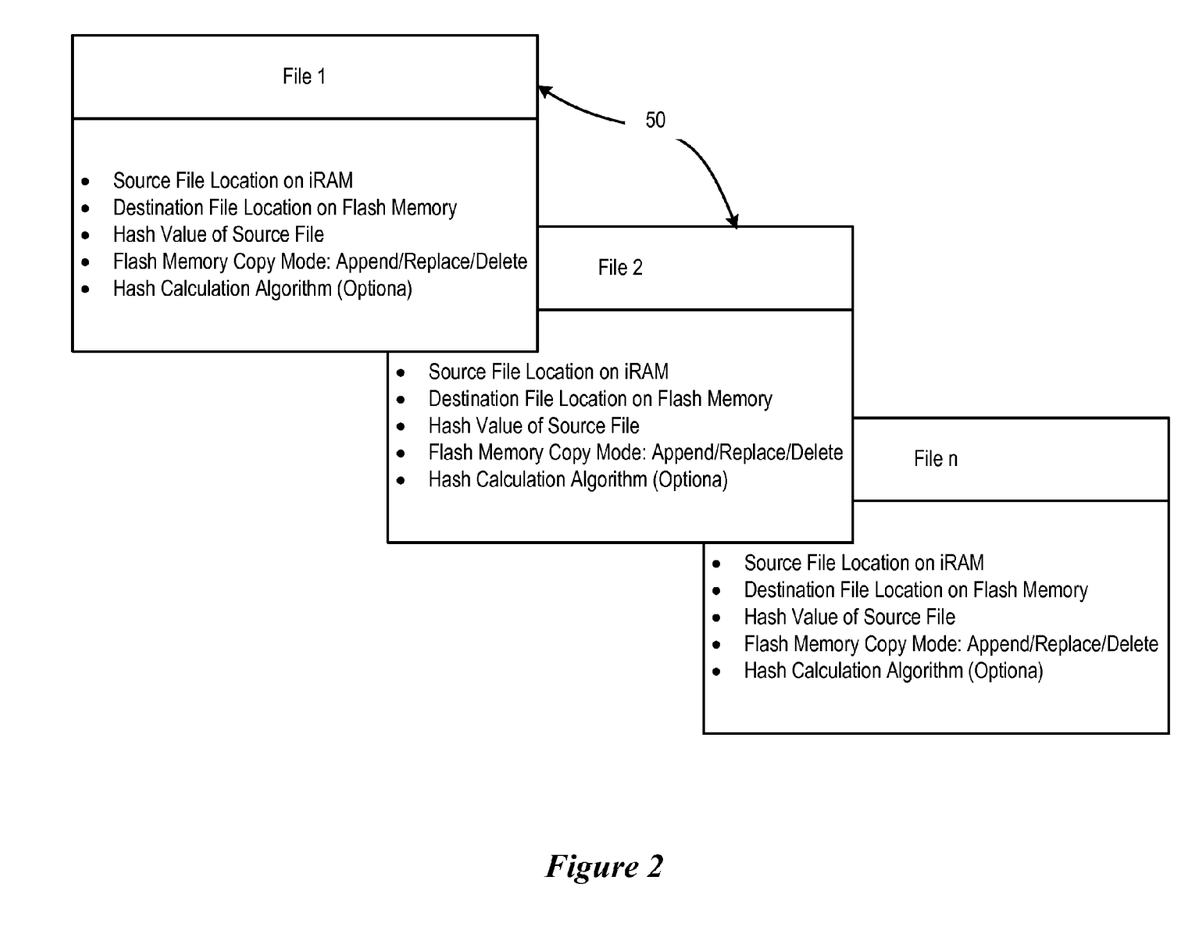
FIG. 2 depicts examples of configuration files that define updates to the storage device.

An example of configuration files 50 to update USB flash memory 26 is depicted by FIG. 2. Configuration files 50 describe the operation and verification for each candidate update to USB flash memory 26. The description includes a file name for the update, a destination location, a hash value for checking accuracy, a copy mode such as append, create, replace or delete, and a security code, such as a hash value generated from the update file with a cryptographic algorithm. The security code is created with a security module 52 associated with firmware updater 46, such as a cryptographic algorithm like MD5 or SHA-1. Once firmware manager 48 receives a request from firmware updater 46 to update USB flash memory 26, firmware manager 48 retrieves information from configuration files 50 to verify each candidate file before performing the update defined by the candidate file. Firmware manager 48 includes a security module 52 which analyzes the candidate update file to validate the performance of the defined update. For example, security module 52 retrieves the update and creates a security code with security module 52, such as with the same cryptographic hash used by firmware updater 46. If the security code placed in the configuration file 50 matches the security code created from the configuration file 50, then the operation defined by configuration file 50 is approved. The communication to verify the configuration file 50 is performed over IPMI bus 40, such as the request for the temporary buffer, the notification of data read on the temporary buffer and status checks by firmware updater 46; actual data transfers that require greater bandwidth than is available on IPMI bus 40 are performed over system bus 42, such as a PCI Express or other main bus. Once an operation defined by a configuration file is approved, firmware manager 48 commands performance of the update. Although the embodiment described above performs an update to provisioning information on a USB flash memory storage device, other embodiments update other types of information written to other types of flash memory devices.

Figure 3A:
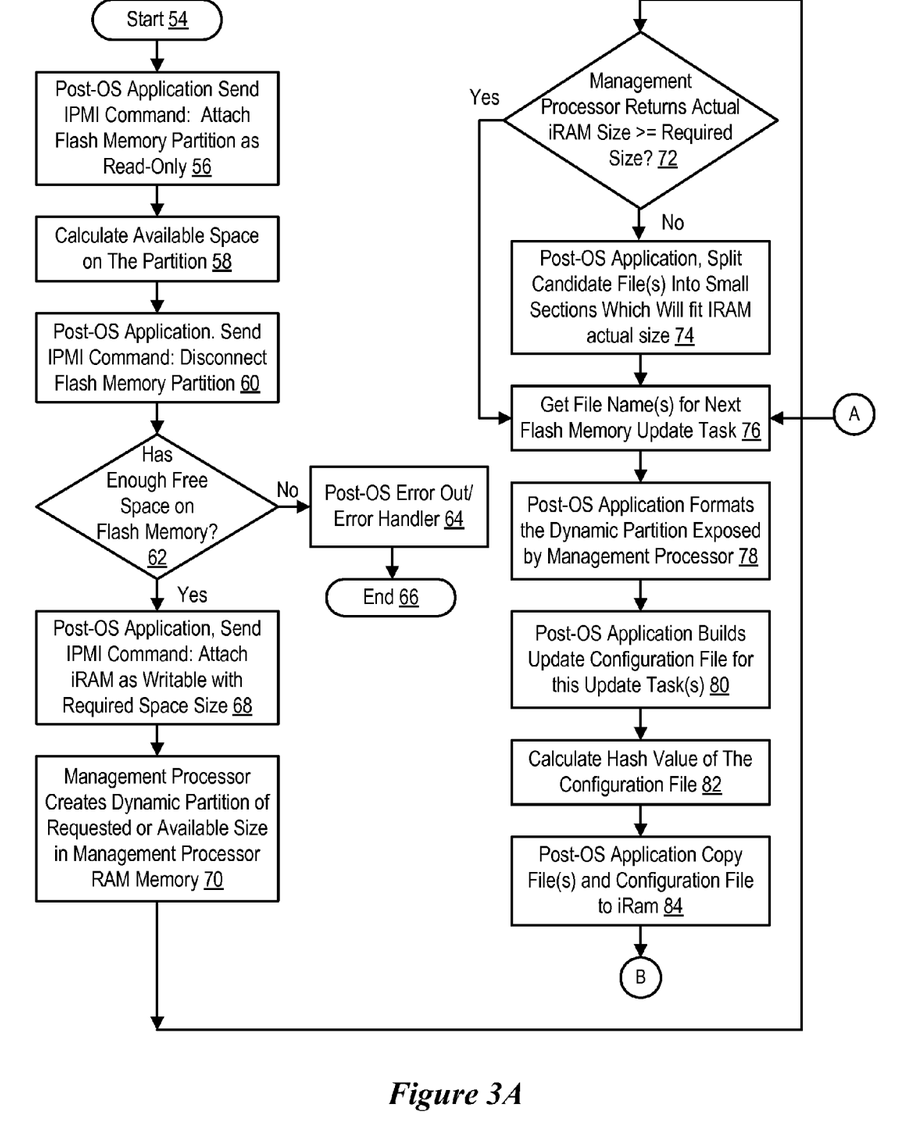
FIGS. 3A, 3B and 3C, generally referred to herein as FIG. 3, depict a flow diagram of a process for secure updates to a storage device coordinated by a management processor.
Figure 3B:
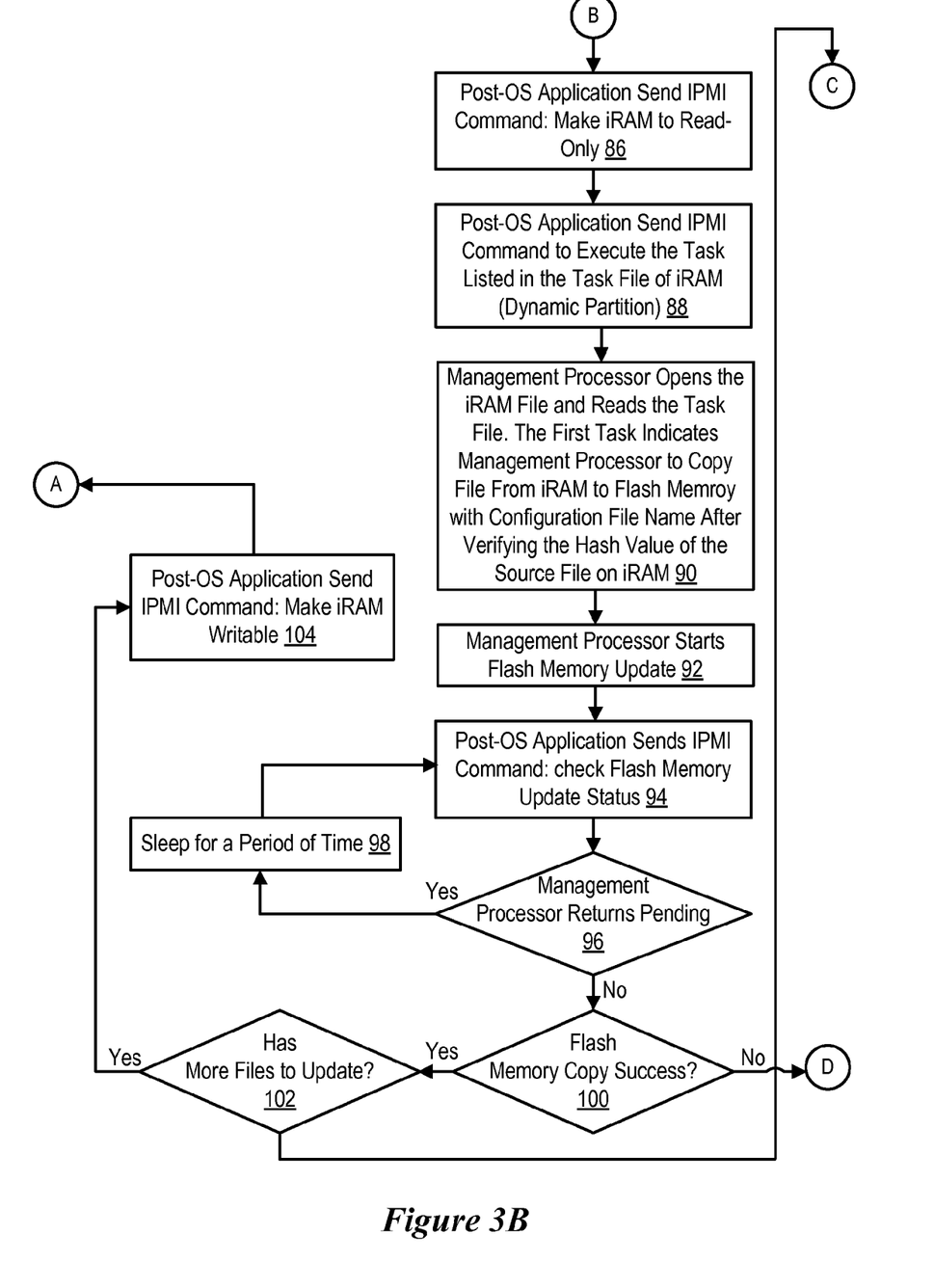
Figure 3C:
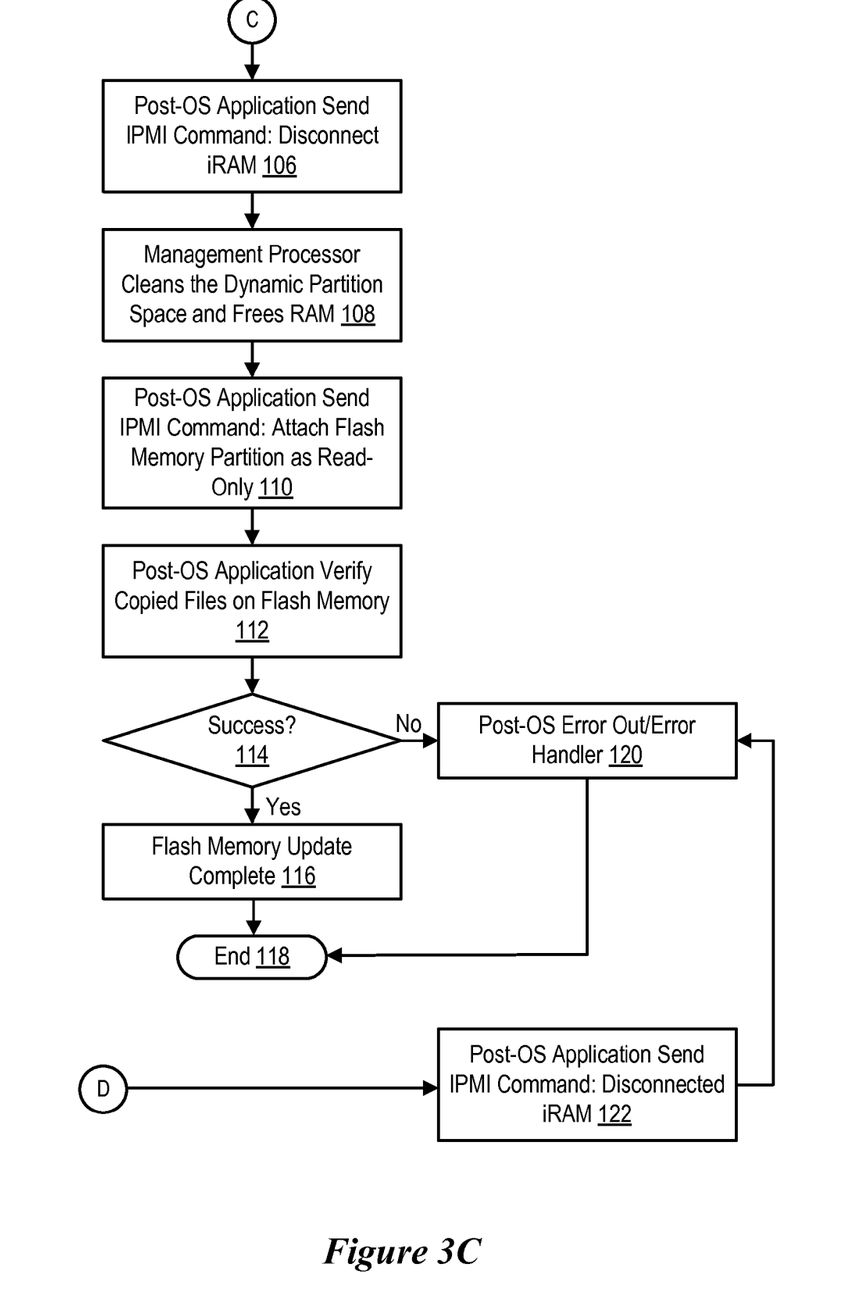

Referring now to FIG. 3, a flow diagram depicts a process for secure updates to a storage device coordinated by a management processor. The process begins at step 54 and proceeds to step 56 for a post-operating system application, such as firmware updater 46, to send an IPMI command to attach a flash memory partition, such as a partition of a USB storage device, as read only. At step 58, the space available on the partition is calculated and at step 60, the post-operating system application sends an IPMI command to disconnect the flash memory partition. At step 62, a determination is made of whether the space available on the partition is sufficient to accept the firmware update. If an insufficient amount of space is available, the process continues to step 64 to provide an error message with the post-operating system application and ends at step 66. If sufficient space is available at step 62, the process continues to step 68 for the post-operating system application to send an IPMI command to attach iRAM as writeable with the required size. At step 70, the management processor responds to the IPMI command by creating a dynamic partition of the requested size in RAM that is associated with the management processor. At step 72 a determination is made of whether the management processor has created a buffer in RAM of sufficient size and, if not, at step 74 the post operating system application splits the update into plural candidate update files of smaller portions that will fit in the RAM buffer set aside by the management processor. At step 76, file names for the next flash memory update task are gathered.

At step 78, the post-operating system application formats the dynamic partition of RAM made available by the management processor. At step 80, the post operating system application builds an update configuration file for the update task or tasks, such as the configuration files depicted by FIG. 2. At step 82, the post operating system application determines a security code, such as a cryptographic hash code for the configuration file and, at step 84, copies the configuration file to the buffer defined in RAM by the management processor. At step 86, the post operating system application sends an IPMI command to make the RAM read only and, at step 88, the post operating system application sends an IPMI command to execute a task list in the configuration file. At step 90, the management processor opens the configuration file from the buffer in the RAM and reads the tasks to find a command to copy the configuration file update to the flash memory after verification of the security code, such as a match of the cryptographic hash code stored in the buffer with a security code generated from the update file. At step 92, the management processor starts the flash memory update through a system bus. Use of the IPMI bus to communicate commands helps ensure security while use of the system bus to copy the information provides adequate bandwidth for more rapid completion of the copying of the update. At step 94, the post operating system application sends a periodic IPMI command to check on the status of the update to the flash memory by sending a status inquiry, determining at step 96 if the management processor returns a pending status and sleeping for a predetermined time period at step 98 until the management process returns that the status is no longer pending.

At step 100, with the status of the update no longer pending, a determination is made of whether the flash memory copy was a success. If not a success, the process continues to step 122 for the post operating system application to send an IPMI command to disconnect the buffer RAM and to step 120 to issue an error message. If the flash memory update was successful, the process continues to step 102 to determine if additional updates are needed. If additional updates are needed, the process returns to step 104 for the post operating system application to send an IPMI command to make the RAM buffer writeable. If the updates are complete, the process continues to step 106 for the post operating system application to send an IPMI command to disconnect the RAM buffer. At step 108, the management processor cleans the dynamic RAM buffer partition and frees the RAM for other uses. At step 110, the post operating system application sends an IPMI command to attach the flash memory partition as read only. At step 112, the post operating system application verifies that the update was correctly applied to the flash memory. At step 114, a determination is made of whether the configuration file update was properly performed to the flash memory. If the update was successful, the flash memory update is complete at step 116 and the process ends at step 118. If the update to the flash memory was not a success, the post operating system application issues an error at step 120 to handle the error and then the process ends at step 118.

Although the present invention has been described in detail, it should be understood that various changes, substitutions and alterations can be made hereto without departing from the spirit and scope of the invention as defined by the appended claims.

What is claimed is:

1. An information handling system comprising:
   a central processing unit (CPU);
   a management processor (MP) having a firmware manager, the firmware manager configured to execute on the MP;
   random access memory (RAM) operable to store information, the RAM interfaced with the CPU and the MP;
   flash memory operable to store firmware; and
   a firmware updater stored in non-transitory memory and configured to execute on the CPU to prepare a firmware update, determine a security code for the firmware update, store the firmware update and the security code in a configuration file in a buffer defined in the RAM by the MP, and send a command over a management bus to execute a task list in the configuration file;
   wherein the firmware manager in response to the command, finds a command in the task list to copy the firmware update to the flash memory after verification of the security code, authorizes copying of the firmware update from the buffer to the flash memory by verifying the security code, and performs the firmware update to be copied from the buffer to the flash memory over a system bus.

2. The information handling system of claim 1 wherein the system bus comprises a USB and the management bus comprises an IPMI.

3. The information handling system of claim 1 wherein:
   the firmware updater comprises a first security module configured to generate a first security code from the firmware update for storage in the buffer with the firmware update;
   the firmware manager comprises a second security module configured to retrieve the firmware update to generate a second security code; and
   the firmware manager is further configured to compare the first and second security codes to authorize copying of the firmware update from the buffer to the flash memory.

4. The information handling system of claim 3 wherein the first and second security codes comprise a cryptographic hash algorithm.

5. The information handling system of claim 1 wherein the buffer is defined in hard disk drive memory.

6. The information handling system of claim 1 wherein the management processor comprises a baseboard management processor.

7. The information handling system of claim 1 wherein the firmware update comprises provisioning information.

8. A method for updating firmware, the method comprising:

generating a firmware update with an application stored in a random access memory (RAM) and running on a central processing unit (CPU), the firmware update having a security code, and storing the firmware update and the security code in a configuration file;

copying with the application the configuration file to a buffer memory defined in the RAM by a management processor (MP);

commanding the MP over a management bus to execute a task list in the configuration file;

in response to a command in the task list, authorizing by the MP copying of the firmware update from the buffer memory to the flash memory by verifying the security code; and copying, in response to the authorizing, the firmware update from the buffer memory to the flash memory with the management processor through a system bus separate from the management bus.

9. The method of claim 8 wherein the system bus comprises USB and the management bus comprises IPMI.

10. The method of claim 9 wherein the generating a firmware update having a security code further comprises generating a hash code with a cryptographic hash algorithm.

11. The method of claim 8 wherein the firmware comprises provisioning information.

12. The method of claim 8 wherein the firmware update comprises a destination and a copy mode.

13. A system for updating firmware stored in flash memory of an information handling system, the system comprising:

a firmware updater stored in non-transitory memory and configured to execute on the CPU to prepare a firmware update, determine a security code for the firmware update, store the firmware update and the security code in a configuration file in a buffer defined in the RAM by the MP, and send a command over a management bus to execute a task list in the configuration file; and a firmware manager operable to run on a management processor, the firmware manager in response to the command from the firmware updater, finds a command in the task list to copy the firmware update to the flash memory after verification of the security code, authorizes copying of the firmware update from the buffer to the flash memory by verifying the security code, and performs the firmware update to be copied from the buffer to the flash memory over a system bus.

14. The system of claim 13 wherein the security code comprises a hash code generated from the firmware update.

15. The system of claim 14 wherein the firmware manager authorizes copying of the firmware update by generating a hash code from the firmware update and comparing the generated hash code with the hash code stored in the buffer.

16. The system of claim 13 wherein the flash memory comprises a USB device.

\* \* \* \* \*